United States Patent [19]  [11] 4,201,754
Clark  [45] May 6, 1980

[54] METHOD FOR THE CONVERSION OF CALCIUM SULFOXY COMPOUNDS INTO CALCIUM CARBONATE COMPOUNDS IN SULFUR OXIDE TREATMENT PROCESSES

[75] Inventor: William E. Clark, Bethel Park, Pa.

[73] Assignee: Continental Oil Company, Stamford, Conn.

[21] Appl. No.: 966,545

[22] Filed: Dec. 5, 1978

[51] Int. Cl.$^2$ .................. C01B 17/00; C01C 1/02; C01F 5/24; C01B 17/16
[52] U.S. Cl. .................. 423/242; 423/431; 423/356; 423/563; 423/574 L
[58] Field of Search .......... 423/242 A, 242 R, 244 A, 423/244 R, 166, 431, 563, 574 G, 569, 356

[56] References Cited

U.S. PATENT DOCUMENTS

| 931,515 | 8/1909 | Sprague | 423/244 |
|---|---|---|---|
| 3,775,532 | 11/1973 | Shah | 423/242 A |
| 3,846,539 | 11/1974 | Renault et al. | 423/242 A |
| 3,989,809 | 11/1976 | Stauffer | 423/356 |

FOREIGN PATENT DOCUMENTS 876442 8/1961 United Kingdom ..................... 423/356

*Primary Examiner*—O. R. Vertiz
*Assistant Examiner*—Gregory A. Heller
*Attorney, Agent, or Firm*—W. A. Mikesell, Jr.; F. Lindsey Scott

[57] ABSTRACT

A method for converting calcium sulfoxy compounds selected from the group consisting of $CaSO_x$ and $Ca(HSO_x)_2$ and their hydrates wherein x is 3 or 4 into calcium carbonate, the method consisting essentially of; converting the $Ca(HSO_x)_2$ compounds into $CaSO_x$ compounds by reacting the $Ca(HSO_x)_2$ compounds with calcium carbonate in the presence of water, thereafter reacting the $CaSO_x$ compounds with ammonia and carbon dioxide in the presence of water to produce $NH_4(HSO_x)$ wherein x is 3 or 4 and calcium carbonate, thereafter separating the $NH_4(HSO_x)$ and calcium carbonate and reacting the $NH_4(HSO_x)$ with carbon to produce ammonia, hydrogen sulfide and carbon oxides.

8 Claims, 1 Drawing Figure

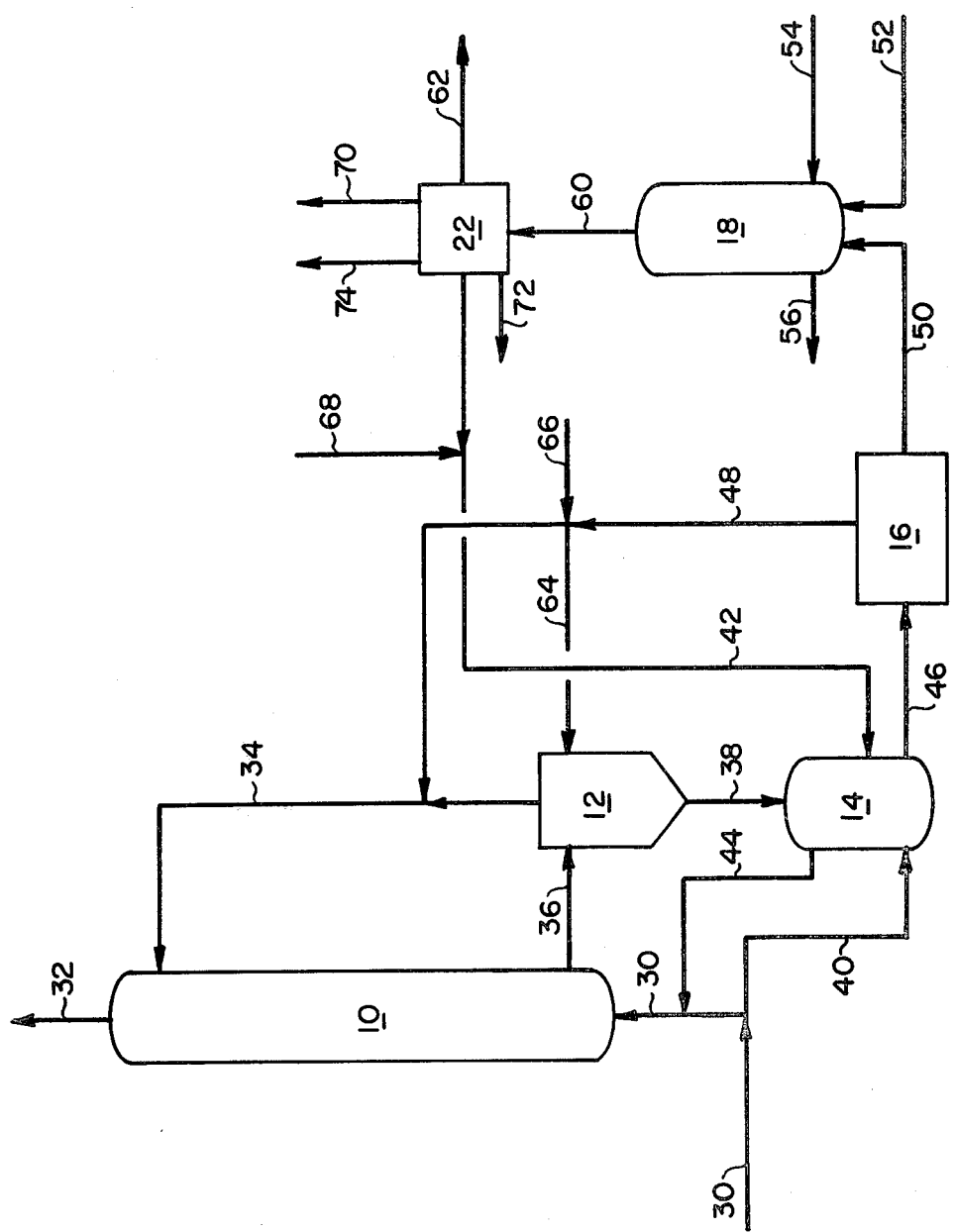

METHOD FOR THE CONVERSION OF CALCIUM SULFOXY COMPOUNDS INTO CALCIUM CARBONATE COMPOUNDS IN SULFUR OXIDE TREATMENT PROCESSES

This invention relates to the conversion of calcium sulfoxy compounds into calcium carbonate.

This invention also relates to processes wherein calcium carbonate is used to absorb sulfur oxides from gaseous streams.

This invention further relates to processes wherein calcium carbonate is used to absorb sulfur compounds from gaseous streams wherein the calcium sulfoxy compounds so produced are converted into calcium carbonate for recycle to the sulfur absorption zone.

As a result of the continuing concern over environmental pollution resulting from the combustion of carbonaceous fuels and the like, an increasing effort has been directed to the development of new and improved methods for removing sulfur oxides from gaseous mixtures so produced. Typically, such mixtures are produced by the combustion of petroleum oils, coal and the like carbonaceous fuels. In one method for removing such sulfur oxides from gaseous mixtures, the gaseous mixtures are contacted with an aqueous stream containing calcium carbonate. The sulfur compounds are absorbed from the gaseous mixture by the calcium carbonate to produce calcium sulfoxy compounds. As is known to those skilled in the art, the calcium sulfoxy compounds commonly produced are $CaSO_3$, $CaSO_4$, $Ca(HSO_3)_2$, $Ca(HSO_4)_2$, their hydrates and the like. Heretofore, the calcium sulfoxy compounds so produced have been used for land fill or the like. As a result, the continuing use of such processes has begun to result in the accumulation of substantial quantities of calcium sulfoxy compounds which are of little value and, in some instances, create serious disposal problems. As a result, a continuing effort has been directed to the development of methods whereby the calcium sulfoxy compounds can be converted into calcium carbonate for recycle to the process. It has now been found that such calcium sulfoxy compounds are readily converted to calcium carbonate compounds by a process which comprises:

(a) converting $Ca(HSO_x)_2$ compounds wherein x is 3 or 4 into $CaSO_x$ compounds wherein x is 3 or 4 by reacting said $Ca(HSO_x)_2$ compounds with $CaCO_3$ in the presence of water;

(b) reacting said $CaSO_x$ compounds with $NH_3$ and $CO_2$ in the presence of water to produce $NH_4(HSO_x)$ wherein x is 3 or 4 and $CaCO_3$;

(c) separating said $NH_4(HSO_x)$ and $CaCO_3$; and (d) reacting said $NH_4(HSO_x)$ with carbon at a temperature from about 1200° F. to about 1600° F. and a pressure from about 0 to about 250 psig to produce $NH_3$, $H_2S$ and carbon oxides.

The FIGURE is a schematic diagram of a process embodying the method of the present invention wherein calcium carbonate is used in the scrubbing vessel to remove sulfur oxides from a gaseous mixture.

In the FIGURE, a scrubber 10 having a flue gas inlet 30 and a desulfurized flue gas outlet 32 is shown. The flue gas entering scrubber 10 through line 30 typically contains carbon dioxide, sulfur oxides and the like as produced by the combustion of sulfur-containing carbonaceous fuels. Scrubber 10 is also equipped with an inlet line 34 and an outlet line 36 for introducing an aqueous slurry of calcium carbonate into an upper portion of scrubber 10 via inlet 34 and recovering a mixture which comprises calcium sulfoxy compounds, unreacted calcium carbonate compounds and the like from a lower portion of scrubber 10 via line 36. The calcium sulfoxy compounds recovered through line 36 are passed to a decanter 12 wherein the calcium sulfoxy compounds are contacted with a calcium carbonate-containing stream introduced into decanter 12 through a line 64. The calcium carbonate introduced into decanter 12 through line 64 reacts with calcium sulfoxy compounds having the formula $Ca(HSO_x)_2$ to produce calcium sulfoxy compounds having a formula $CaSO_x$ which are relatively insoluble in aqueous solution and precipitate thereby permitting their separation from the large quantity of water present in vessel 12. The precipitated calcium sulfoxy compounds which, as indicated, are primarily of the formula $CaSO_x$ are then passed through a line 38 to a reactor 14. The water recovered from vessel 12 is passed to line 34 to form part of the inlet stream flowing through line 34 into scrubber 10. In reactor 14, the calcium sulfoxy compounds are reacted with carbon dioxide and ammonia to produce compounds of the general formula $NH_4(HSO_x)$ and calcium carbonate. Ammonia and carbon dioxide are passed to reactor 14 via a line 42 with additional carbon dioxide as required being introduced into reactor 14 via a line 40 which passes a portion of the flue gas stream to reactor 14. Such streams as the one charged to reactor 14 via line 40 will normally contain small amounts of sulfur oxides and such causes no problem since the sulfur oxides are readily removed in reactor 14 by contact with the calcium carbonate in reactor 14 or in scrubber 10 since the gases exiting reactor 14 are conveniently passed back to line 30 via a line 44 and through scrubber 10. If desired, the carbon dioxide used can be provided from the desulfurized gas stream exiting scrubber 10 via line 32 or the like. The $NH_4(HSO_x)$ compounds and calcium carbonate produced in reactor 14 are passed from reactor 14 via a line 46 to a solid-liquid separation zone 16 where the calcium carbonate which is relatively insoluble in water is removed by filtration (or other solid-liquid separation known to the art) and passed through a line 48 to line 34 to form the charge to scrubber 10. As indicated previously, a portion of the calcium carbonate is removed via a line 64 and passed to decanter 12. An aqueous stream is recovered from filter 16 via line 50 and contains the $NH_4(HSO_x)$ compounds which are passed to a reactor 18. In reactor 18, the $NH_4(HSO_x)$ compounds are contacted with carbon in the form of char, coal, or the like to produce ammonia, hydrogen sulfide and carbon oxides. Coal is charged to reactor 18 via a line 54 and oxygen is charged to reactor 18 via a line 52. Reactor 18 is any suitable reactor for contacting the aqueous $NH_4(HSO_x)$ with coal and, for instance, may be an ebullated bed of coal wherein heat is supplied by the combustion of a portion of the coal by the oxygen injected through line 52. Solid residue is removed from reactor 18 through a line 56. The gaseous products from reactor 18 are recovered via a line 60 and passed to an ammonia and hydrogen sulfide separation zone 22 where hydrogen sulfide is separated and recovered through a line 62 with ammonia and carbon dioxide being recovered through a line 42 and passed to vessel 14. The hydrogen sulfide is desirably sent to sulfur recovery or the like. The ammonia and carbon doxide may be recycled either partially or completely to vessel 14, although in many instances, it is likely that excess carbon dioxide will be present, and in such cases, the ammonia and carbon dioxide may require further separation. Excess carbon dioxide recovery from zone 22 is via a line 70, such excess carbon dioxide may be sent to a stack, to line 32 or the like. Water is recovered from zone 22 via a line 72 and may be used as make-up or the like. The heating value of components such as $H_2$ and CO entering zone 22 via line 60 may be of sufficient magnitude to warrant recovery. Any such recovered heating values are shown leaving zone 22 via line 74. These combustibles are optionally burned to provide reheat for line 32, recycle to reactor 18 or the like. Addition of make-up $CaCO_3$ and $H_2O$ is shown via a line 66; and addition of make-up $NH_3$ is shown via a line 68.

The reaction of the sulfur oxides with calcium carbonate in the scrubber is well known and need not be discussed further. The reaction of the $Ca(HSO_x)_2$ with calcium carbonate to produce $CaSO_x$ is shown in equation (1). Reaction conditions in vessel 12 are not critical and, while desirably below about 200° F., can otherwise be conducted at the temperature at which the calcium sulfoxy salts are recovered from scrubber 10.

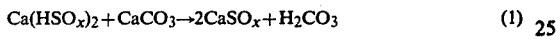

$$Ca(HSO_x)_2 + CaCO_3 \rightarrow 2CaSO_x + H_2CO_3 \quad (1)$$

The $CaSO_x$ salts are relatively insoluble and are readily precipitated and recovered from the aqueous stream in vessel 12 so that the aqueous stream can be directed through line 34 back to scrubber 10.

In some instances, the sulfoxy compounds present may be primarily of the form $CaSO_x$. In such instances, the contacting with $CaCO_3$ to convert the $Ca(HSO_x)_2$ compounds to $CaSO_x$ compounds is unnecessary and the stream passed to vessel 12 can suitably be passed directly to $NH_3$ and $CO_2$ contacting in vessel 14. Aqueous solutions of $Ca(HSO_x)_2$, $CaSO_x$ or mixtures thereof are suitably treated by the method of the present invention. It should be understood that such calcium sulfoxy compounds exist in aqueous solution in many instances as their hydrates and such are considered within the scope of the present invention. The $CaSO_x$ salts are then reacted with ammonia and carbon dioxide to produce $NH_4(HSO_x) + CaCO_3$ as set forth below in equation (2).

$$CaSO_x + NH_3 + CO_2 + H_2O \rightarrow NH_4(HSO_x) + CaCO_3 \quad (2)$$

The calcium carbonate so produced is relatively insoluble and is readily separated in solid-liquid separation zone 16 from the water-soluble ammonium sulfoxy salts. While reference has been made to $NH_4(HSO_x)$ herein as the product water-soluble ammonium sulfoxy salt, it is noted that other water-soluble ammonium sulfoxy salts such as $NH_4(SO_x)_2$ and the like may also be produced as is known to those skilled in the art. Such salts may be considered the equivalent of $NH_4(HSO_x)$ since they are typically present and since, in general, they behave the same chemically in the reactions of interest. The ammonium sulfoxy salts are then passed through line 50 to reactor 18 where they are reacted with carbon to produce ammonia and hydrogen sulfide.

$$NH_4(HSO_x) + x/2C \rightarrow H_2S + NH_3 + x/2CO_2 \quad (3)$$

The reaction conditions in vessel 18 are desirably below about 1600° F. and it is preferred that the operating temperature in vessel 18 be between about 1200° and about 1600° F. It is particularly preferred that the operating temperature be from about 1300° to about 1500° F.

The pressure in vessel 18 is typically from about 0 to about 250 p.s.i.g., and preferably from about 50 to about 100 p.s.i.g. The oxygen injected into reactor 18 may be in the form of air, substantially pure oxygen, oxygen-enriched air or the like. In some instances, it may be desirable to operate reactor 18 in such a way that a synthesis gas is produced via line 60. While the primary objective of reactor 18 is the conversion of the ammonium sulfoxy salts into ammonia and hydrogen sulfide, it may be possible to produce a synthesis gas mixture in this reactor. Preferably, the amount of oxygen is controlled to that required to generate sufficient heat to maintain the reaction zone at a desired temperature. As indicated previously, reactor 18 can assume a variety of configurations, but it is preferred that an ebullated bed of finely divided coal or finely divided solids in mixture with coal be used for accomplishing the reaction in reactor 18. Clearly, the carbon can be introduced into reactor 18 as coal of various grades, char, or the like. When coal is used, it may be necessary to remove volatile tars and the like from the stream flowing through line 60 prior to recycling ammonia and carbon dioxide to vessel 14 and the like. Such variations are well known to those skilled in the art and since they form no part of the present invention, will not be discussed further. The primary objective is, as stated previously, the conversion of the ammonium sulfoxy salts into ammonia and hydrogen sulfide. Such is accomplished with the mixture of ammonia and hydrogen sulfide flowing to separator 22 where the hydrogen sulfide and ammonia are separated. The separation of ammonia and hydrogen sulfide from condensed water in separator 22 can be by means known to those skilled in the art such as the process set forth in "Sour-Water Processing Turns Problem into Payout", R. J. Annessen and G. D. Gould, Chemical Engineering, Mar. 22, 1971, pp 67–69. The hydrogen sulfide may also be recovered by processes which produce sulfur from the $H_2S$ as, for example, in the Stretford process; or the $H_2S$ may be removed and recovered for further processing by means of one of the acid gas removal processes or the like. The ammonia and, optionally at least, a part of the carbon dioxide are recycled to reactor 14. Such separations form no part of the present invention and need not be discussed further.

As known to those skilled in the art, "double alkali" processes wherein alkali metal carbonate compounds such as $Na_2CO_3$, $NaHCO_3$, $K_2CO_3$, $KHCO_3$ and the like are used to absorb sulfur oxides by the production of compounds such as $NaSO_x$, $NaHSO_x$, $K_2SO_x$, $KHSO_x$ and the like wherein x is 3 or 4 which are subsequently reacted with $CaCO_3$ to produce calcium sulfoxy compounds result in the production of calcium sulfoxy compounds similar to those produced when calcium salts are used to absorb sulfur oxides. Such calcium sulfoxy compounds are suitable for regeneration to calcium carbonate by the method of the present invention.

By the process of the present invention, the calcium sulfoxy salts generated by the absorption of sulfur oxides by calcium carbonate is accomplished. The sulfur oxides are recovered as sulfur by the use of coal as a reagent for reducing the sulfoxy compounds to hydrogen sulfide which is conveniently processed to produce sulfur. The calcium compounds are recovered for recycle to the scrubber zone thereby resulting in the production of no substantial accumulation of undesirable by-products for disposal by land fill or the like.

Having thus described the present invention by reference to certain of its preferred embodiments, it is respectively pointed out that many variations and modifications are possible within the scope of the present invention and it is anticipated that many such variations and modifications may be considered obvious or desirable to those skilled in the art based upon a review of the foregoing description of the preferred embodiments.

Having thus described the invention, I claim:

1. A method for converting calcium sulfoxy compounds selected from the group consisting of $CaSO_x$ and $Ca(HSO_x)_2$ and their hydrates wherein x is 3 or 4 into calcium carbonate, said method consisting essentially of:
  (a) converting said $Ca(HSO_x)_2$ compounds into said $CaSO_x$ compounds by reacting said $Ca(HSO_x)_2$ compounds with $CaCO_3$ in the presence of water;
  (b) reacting said $CaSO_x$ compounds with $NH_3$ and $CO_2$ in the presence of water to produce $NH_4(HSO_x)$ wherein x is 3 or 4 and $CaCO_3$;
  (c) separating said $NH_4(HSO_x)$ and $CaCO_3$; and
  (d) reacting said $NH_4(HSO_x)$ with carbon at a temperature from about 1200° to about 1600° F. and a pressure from about 0 to about 250 p.s.i.g. to produce $NH_3$, $H_2S$, and carbon oxides.

2. The method of claim 1 wherein said $NH_3$ is recycled to step (b).

3. The method of claim 1 wherein said $H_2S$ is recovered and passed to sulfur recovery.

4. The method of claim 1 wherein said calcium sulfoxy compounds are produced by the absorption of $SO_{(x-1)}$ wherein x is 3 or 4, from gaseous mixtures containing said $SO_{(x-1)}$ by contacting said mixtures with aqueous calcium carbonate compounds.

5. The method of claim 1 wherein said calcium sulfoxy compounds are produced by the absorption of $SO_{(x-1)}$ wherein x is 3 or 4, from gaseous mixtures containing said $SO_{(x-1)}$ by contacting said mixtures with an aqueous solution containing at least one alkali metal carbonate compound selected from the group consisting of $Na_2CO_3$, $NaHCO_3$, $K_2CO_3$ and $KHCO_3$ to produce at least one alkali metal sulfoxy compound selected from the group consisting of $K_2SO_x$, $KHSO_x$, $Na_2SO_x$, $Na(HSO_x)$ and mixtures thereof wherein x is 3 or 4, said alkali metal sulfoxy compound thereafter being reacted with aqueous $CaCO_3$ to produce said calcium sulfoxy compounds and at least one of said alkali metal carbonate compounds, said calcium sulfoxy compounds being separated from said alkali metal carbonate compound.

6. A method for removing sulfur oxides from gaseous mixtures containing said sulfur oxides, said method consisting essentially of:
  (a) contacting said gaseous mixtures with aqueous $CaCO_3$, to produce at least one calcium sulfoxy compound selected from the group consisting of $CaSO_x$ and $Ca(HSO_x)_2$ and their hydrates wherein x is 3 or 4 thereby removing said sulfur oxides from said mixtures;
  (b) converting said $Ca(HSO_x)_2$ compounds into said $CaSO_x$ compounds by reacting said $Ca(HSO_x)_2$ compounds with $CaCO_3$ in the presence of water;
  (c) reacting said $CaSO_x$ compounds with $NH_3$ and $CO_2$ in the presence of water to produce $NH_4(HSO_x)$ wherein x is 3 or 4 and $CaCO_3$;
  (d) separating said $NH_3(HSO_x)$ and $CaCO_3$; and
  (e) reacting said $NH_4(HSO_x)$ with carbon at a temperature from about 1200° to about 1600° F. and a pressure from about 0 to about 250 p.s.i.g. to produce $NH_3$, $H_2S$, and carbon oxides.

7. A method for removing sulfur oxides from gaseous mixtures containing said sulfur oxides, said method consisting essentially of:
  (a) contacting said gaseous mixtures with an aqueous solution containing at least one alkali metal carbonate compound selected from the group consisting of $NaHCO_3$, $Na_2CO_3$, $K_2CO_3$, $KHCO_3$, and mixtures thereof to produce at least one alkali metal sulfoxy compound selected from the group consisting of $Na_2SO_x$, $NaHSO_x$, $K_2SO_x$, $KHSO_x$ wherein x is 3 or 4, and mixtures thereof thereby removing said sulfur oxides from said mixture;
  (b) reacting said alkali metal sulfoxy compounds with aqueous $CaCO_3$ to produce said alkali metal carbonate compounds and $CaSO_x$ wherein x is 3 or 4;
  (c) separating said alkali metal carbonate compounds and said calcium sulfoxy compounds;
  (d) reacting said $CaSO_x$ compounds with $NH_3$ and $CO_2$ in the presence of water to produce $NH_4(HSO_x)$ wherein x is 3 or 4 and $CaCO_3$;
  (e) separating said $NH_4(HSO_x)$ and $CaCO_3$; and
  (f) reacting said $NH_4(HSO_x)$ with carbon at a temperature from about 1200° to about 1600° F. at a pressure from about 0 to about 250 p.s.i.g. to produce $NH_3$, $H_2S$ and carbon oxides.

8. A method for converting calcium sulfoxy compounds selected from the group consisting of $CaSO_x$ and its hydrates wherein x is 3 or 4 into calcium carbonate, said method consisting essentially of:
  (a) reacting said $CaSO_x$ compounds with $NH_3$ and $CO_2$ in the presence of water to produce $NH_4(HSO_x)$ wherein x is 3 or 4 and $CaCO_3$;
  (b) separating said $NH_4(HSO_x)$ and $CaCo_3$; and
  (c) reacting said $NH_4(HSO_x)$ with carbon at a temperature from about 1200° to about 1600° F. at a pressure from about 0 to about 250 p.s.i.g. to produce $NH_3$, $H_2S$, and carbon oxides.

* * * * *

UNITED STATES PATENT OFFICE
CERTIFICATE OF CORRECTION

PATENT NO. : 4,201,754

DATED : May 6, 1980

INVENTOR(S) : William E. Clark

It is certified that error appears in the above-identified patent and that said Letters Patent are hereby corrected as shown below:

Column 6, line 50: "$CaCo_3$" should read --$CaCO_3$--

Signed and Sealed this

Nineteenth Day of August 1980

[SEAL]

Attest:

SIDNEY A. DIAMOND

Attesting Officer

Commissioner of Patents and Trademarks